United States Patent [19]
ITT Industries, Inc. et al.

[11] Patent Number: 4,565,066
[45] Date of Patent: Jan. 21, 1986

[54] DIE-CASTING MOLD FOR A BRAKE MASTER CYLINDER HOUSING AND A DIE-CAST BRAKE MASTER CYLINDER HOUSING MANUFACTURED WITH THIS MOLD

[75] Inventors: Rolf Weiler, Frankfurt-Sindlingen; Klaus Bergelin, Wermelskirchen, both of Fed. Rep. of Germany ITT Industries, Inc., New York, N.Y.

[73] Assignee:

[21] Appl. No.: 500,065

[22] Filed: Jun. 1, 1983

[30] Foreign Application Priority Data

Jun. 29, 1982 [DE] Fed. Rep. of Germany ....... 3224168

[51] Int. Cl.⁴ .............................................. F15B 15/08
[52] U.S. Cl. ...................................... 60/533; 60/585; 60/592
[58] Field of Search ................. 60/533, 585, 578, 592, 60/581; 164/132, 235, 340

[56] References Cited

U.S. PATENT DOCUMENTS

| | | | |
|---|---|---|---|
| 1,466,738 | 9/1923 | Morse | 164/132 |
| 2,148,273 | 2/1939 | LaBrie | 60/585 |
| 2,311,787 | 2/1943 | Swift | 60/578 |
| 3,171,257 | 3/1965 | Randol | 60/578 |
| 4,455,831 | 6/1984 | Maehava | 60/578 X |

FOREIGN PATENT DOCUMENTS

| | | | |
|---|---|---|---|
| 881879 | 5/1943 | France | 60/585 |
| 0086850 | 7/1981 | Japan | 60/581 |
| 2052656A | 1/1981 | United Kingdom | 60/585 |
| 2074675A | 11/1981 | United Kingdom | 60/578 |

*Primary Examiner*—William R. Cline
*Assistant Examiner*—Randolph A. Smith
*Attorney, Agent, or Firm*—James B. Raden

[57] ABSTRACT

The die-casting mold and the die-cast brake master cylinder housing comprise an axial master cylinder piston bore and a compensating bore, whose latter axis extends parallel to the axis of the master cylinder piston bore. The compensating bore has one end terminating in a compensating reservoir port oriented transversely relative to the housing's longitudinal axis and its other end terminating in a sealing chamber that is formed by an extension of the master cylinder piston bore. To render the casting process for manufacturing a die-cast brake master cylinder housing simpler, the mold comprises a core for the compensating bore whose longitudinal cross-sections containing the longitudinal axis are of conical construction, with the narrowest point being adjacent to the compensating reservoir port and whose cross-sections extending vertically to the longitudinal axis are of substantially reniform construction, while the concave sides of the cross-sections are close to the master cylinder piston bore.

14 Claims, 5 Drawing Figures

DIE-CASTING MOLD FOR A BRAKE MASTER CYLINDER HOUSING AND A DIE-CAST BRAKE MASTER CYLINDER HOUSING MANUFACTURED WITH THIS MOLD

BACKGROUND OF THE INVENTION

The present invention relates to a die-casting mold for a brake master cylinder housing and a brake master cylinder housing manufactured by this mold which contains an axial master cylinder piston bore and a compensating bore, whose latter axis extends parallel to the axis of the master cylinder piston bore. The compensating bore has one end terminating in a compensating reservoir port that is oriented transversely relative to the housing's longitudinal axis and its other end terminating in a sealing chamber that is formed by an extension of the master cylinder piston bore.

From German Patent DE-OS No. 3,021,893, there is known a brake master cylinder housing comprising an axial master cylinder piston bore and a compensating bore whose latter axis extends parallel to the axis of the master cylinder piston bore. In this brake master cylinder housing, the compensating bore is constructed as a stepped bore, with the portion of the bore of smaller diameter terminating in the compensating reservoir port and the portion of larger diameter terminating in a sealing chamber.

When constructing the housing in this fashion, various problems will be encountered, particularly when the housing is constructed as a die-cast housing, for reasons of manufacture. Due to the stepped shape of the wall of the compensating bore, a draft angle can be manufactured only by retrospective drilling of the compensating bore. Besides, it is not possible without difficulty to provide for a sufficiently stable core necessary for the molding process, since it must be ensured that sufficient wall thickness is maintained in the area of the reservoir port because the pressure discharge ports are also arranged in this area.

SUMMARY OF THE INVENTION

It is, therefore, an object of the present invention to provide a brake master cylinder housing and a die-casting mold of the type initially referred to which enables construction of the compensating bore with a sufficient draft angle during manufacture of the brake master cylinders housing by die-casting, with the cores used affording sufficient stability of the brake master cylinder housing and sufficient wall thickness in the area of the compensating reservoir port.

A feature of the present invention is the provision of a die-casting mold for a brake master cylinder housing containing an axial master cylinder piston bore and a compensating bore, the compensating bore having a longitudinal axis parallel to a longitudinal axis of the piston bore, one end terminating in a compensating reservoir port disposed in a transverse relationship with the longitudinal axis of the piston bore and the other end terminating in a sealing chamber formed by an extension of the piston bore, the mold comprising a first core for the compensating bore whose longitudinal cross-sections containing the longitudinal axis of the compensating bore are conical with the narrowest point being adjacent the compensating reservoir port and whose cross-sections extending vertically relative to the longitudinal axis of the compensating bore are constructed substantially uniformly with concave surfaces thereof being disposed adjacent the piston bore.

Another feature of the present invention is the provision of a die-cast brake master cylinder housing comprising a master cylinder piston bore disposed coaxially of a longitudinal axis of the housing; and a compensating bore having a longitudinal axis spaced from and parallel to the longitudinal axis of the housing, the compensating bore having one end thereof terminating in a compensating reservoir port disposed transversely relative to the longitudinal axis of the housing and its other end terminating in a sealing chamber formed as an extension of the piston bore, the compensating bore having longitudinal cross-sections containing and parallel to longitudinal axes of the compensating bore of conical construction, the narrowest of the longitudinal cross-sections being adjacent the compensating reservoir port, and the compensating bore having cross-sections extending vertically relative to the longitudinal axis of the compensating bore constructed substantially reniformly with concave surfaces thereof being disposed adjacent the piston bore.

Accordingly, a die-casting mold is provided which is of very straightforward construction in terms of casting practice, while it is ensured that the cores used will not melt or be damaged in any way during the casting process and can be easily removed after the casting process. In addition, there will result from the special shape of the compensating bore a sufficient draft angle which is particularly effective also because of its marginal areas lying considerably deeper at the port that leads to the sealing chamber than in the area of the compensating reservoir port.

To still further simplify the manufacture of the mold, an embodiment of the inventive idea provides that the mold contains another core for the shaping of the master cylinder bore, this core being expediently of integral construction with the core for the compensating bore.

According to another embodiment of this invention, it will be arranged that the outer and inner boundaries of the reniform cross-sections are concentrical circles whose central point is disposed on the axis of the master cylinder piston bore, and in that the lateral boundaries of the reniform cross-section are of circular construction.

The vertex angle of the cone of the surface of the compensating bore relative to the longitudinal axis of the compensating bore in the plane containing the longitudinal axis of the compensating bore and of the master cylinder piston bore preferably amounts to 0.5°, while the vertex angle of the cone b between the longitudinal axis of the compensating bore and the surface of the compensating bore which extends vertically relative to the above-mentioned plane suitably amounts to about 5°.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
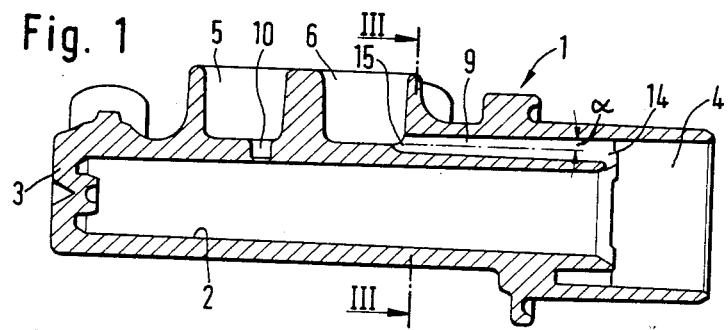
FIG. 1 is a longitudinal cross-sectional view of a die-cast brake master cylinder housing in accordance with the principles of the present invention.
Figure 2:
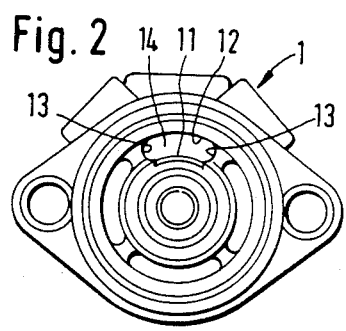
FIG. 2 is a right-hand end view of the die-cast brake master cylinder housing of FIG. 1.
Figure 3:
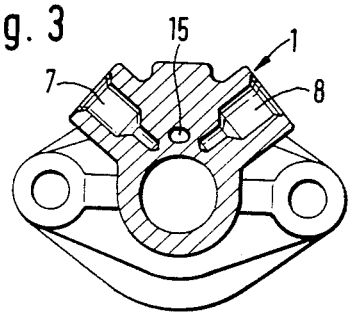
FIG. 3 is a transverse cross-sectional view of the die-cast brake master cylinder housing of FIG. 1 taken along the line III—III.

The brake master cylinder housing 1 illustrated in FIGS. 1-3 contains a central master cylinder piston bore 2 which is closed on one side (the left side in FIG. 1) by an end wall 3 and which proceeds on the other side (the right side in FIG. 1) into an enlarged cylindrical sealing chamber 4. Furthermore, there are disposed in the brake master cylinder housing 1 two compensating reservoir ports 5, 6 whose longitudinal axes extend perpendicular with respect to the longitudinal axis of the master cylinder piston bore 2, as well as two pressure discharge ports 7 and 8 (FIG. 3) which extends transversely relative to the plane of FIG. 1.

A compensating bore 9 extends from the compensating reservoir port 6 to the sealing chamber 4. A corresponding compensating bore 10 of the compensating reservoir port 5 terminates radially into the master cylinder piston bore 2.

Figure 4:
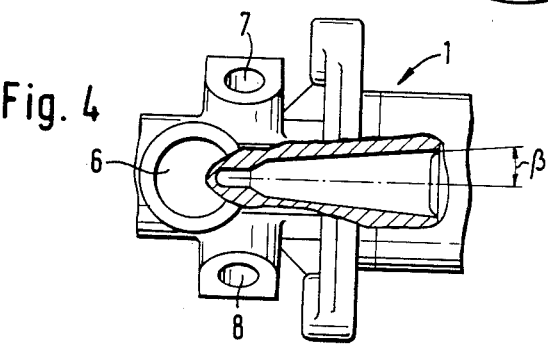
FIG. 4 is a partial top view of the die-cast brake master cylinder housing of FIG. 1 in the area of the compensating reservoir port and the compensating bore, with parts of the housing wall having been removed to expose the compensating bore.

The longitudinal axis of the compensating bore 9 extends parallel to the longitudinal axis of the master cylinder piston bore 2. The longitudinal cross-sections of the compensating bore 9 which contains its longitudinal axis are of conical construction with the narrowest point being adjacent to compensating reservoir port 6 and enlarging continuously towards sealing chamber 4. The surface of the compensating bore 9 disposed in the plane of FIG. 1 is at a vertex angle of a cone with respect to the longitudinal axis of the compensating bore amounting to 9.5°, while a vertex angle of cone β of about 5° (FIG. 4) is provided between the longitudinal axis of the compensating bore and a surface of the compensating bore disposed vertically relative to this plane.

The cross-section compensating bore 9 vertically relative to the plane of intersection of FIG. 1, i.e., vertically relative to the longitudinal axis of master cylinder bore 2, comprises radial boundaries 11 and 12 which are formed by circular portions whose central point coincides with the axis of master cylinder piston bore 2. The lateral boundaries 13 of this cross-section compensating bore 9 are likewise constituted by circular arcs whose diameter corresponds substantially to the difference between the radii of the circular arcs that form the outer boundaries 11 and 12. This gives the cross-section a reniform shape, and as a result thereof the marginal areas of the compensating bore 9 will lie deeper in the housing than the intermediate area. Since these marginal areas are thus dependent upon the width of the port 14, laterally declined at the port 14 of the compensating bore 9 leading into the sealing chamber 4, there can be achieved a relatively large inclination of the compensating bore 9 in the marginal areas without decreasing too much the wall thickness in the area of the port 15 of the compensating bore 9 leading to the compensating reservoir port 6.

Figure 5:
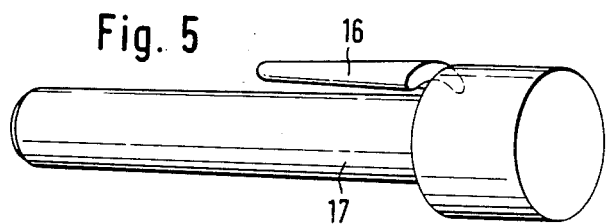
FIG. 5 is a perspective view of a casting core for the shaping of the master cylinder piston bore and the compensating bore in accordance with the principles of the present invention.

An outer die-casting mold, not illustrated, but shaped similar to the outline of the housing of FIG. 1, will be used to manufacture the brake master cylinder housing 1 as an integral die-cast component. Inserted into the die-casting mold will be a core 16 for the compensating bore 9 shown in FIG. 5 which core has a shape corresponding to the form of the compensating bore 9 so that there is no need for further machining the bore apart from the removal of the burrs in the area of ports 14 and 15. A corresponding core 17 is provided for the master cylinder piston bore 2 and the sealing chamber 4. There is, of course, a finishing operation required for the manufacture of the master cylinder piston bore 2 and the sealing chamber 4, since these cooperate with (non-illustrated) master cylinder pistons and seals.

The cores 16 and 17 can likewise be of integral construction so that one single core 16 and 17 will be needed for the molding construction of master cylinder piston bore 2, of cylinderical sealing chamber 4 that receives a sealing arrangement and of compensating bore 9.

While we have described above the principles of our invention in connection with specific apparatus, it is to be clearly understood that this description is made only by way of example and not as a limitation to the scope of our invention as set forth in the objects thereof and in the accompanying claims.

We claim:

1. A one-piece die-cast brake master cylinder housing, said housing having a longitudinal axis and said housing comprising:
a master cylinder piston bore disposed coaxially of said longitudinal axis of said housing; and a compensating bore in a wall of said housing, said compensating bore having a longitudinal axis spaced from and parallel to said longitudinal axis of said housing, said compensating bore having one end thereof terminating in a compensating reservoir port disposed transversely relative to said longitudinal axis of said housing and externally of the piston bore and its other end terminating in a sealing chamber formed as an extension at one longitudinal end of said piston bore, said compensating bore being of continuous conical construction, the narrowest area of said compensating bore being adjacent said compensating reservoir port, and a cross section of said compensating bore perpendicular to said longitudinal axis of said compensating bore being substantially reinform.

2. A housing according to claim 1, wherein there are two compensating bores each having continuous conical construction, each having vertical reniform cross-section, and in which the inner and outer boundaries of said reniform cross-sections are concentric circular portions each having a central point disposed on said longitudinal axis of said piston bore.

3. A housing according to claim 2, wherein the side boundaries of said reniform cross-sections are of circular construction.

4. A housing according to claim 3, wherein a first vertex cone angle of a surface of said compensating bore relative to said longitudinal axis of said compensating bore in a plane containing said longitudinal axis of said compensating bore and said longitudinal axis of said piston bore is about 0.5°.

5. A housing according to claim 4, wherein a second vertex cone angle between said longitudinal axis of said compensating bore and a surface of said compensating bore extending vertically from said plane is about 5°.

6. A housing according to claim 2, wherein a first vertex cone angle of a surface of said compensating bore relative to said longitudinal axis of said compensating bore in a plane containing said longitudinal axis of said compensating bore and said longitudinal axis of said piston bore is about 0.5°.

7. A housing according to claim 6, wherein a second vertex cone angle between said longitudinal axis of said compensating bore and a surface of said compensating bore extending vertically from said plane is about 5°.

8. A housing according to claim 1, wherein the side boundaries of said reniform cross-sections are of circular construction.

9. A housing according to claim 8, wherein a first vertex cone angle of a surface of said compensating bore relative to said longitudinal axis of said compensating bore in a plane containing said longitudinal axis of said compensating bore and said longitudinal axis of said piston bore is about 0.5°.

10. A housing according to claim 9, wherein a second vertex cone angle between said longitudinal axis of said compensating bore and a surface of said compensating bore extending vertically from said plane is about 5°.

11. A housing according to claim 8, wherein a second vertex cone angle between said longitudinal axis of said compensating bore and a surface of said compensating bore extending vertically from said plane is about 5°.

12. A housing according to claim 1, wherein a first vertex cone angle of a surface of said compensating bore relative to said longitudinal axis of said compensating bore in a plane containing said longitudinal axis of said compensating bore and said longitudinal axis of said piston bore is about 0.5°.

13. A housing according to claim 12, wherein a second vertex cone angle between said longitudinal axis of said compensating bore and a surface of said compensating bore extending vertically from said plane is about 5°.

14. A housing according to claim 1, wherein a vertex cone angle between said longitudinal axis of said compensating bore and a surface of said compensating bore extending vertically from said plane is about 5°.

* * * * *

UNITED STATES PATENT AND TRADEMARK OFFICE
CERTIFICATE OF CORRECTION

PATENT NO.  : 4,565,066
DATED       : January 21, 1986
INVENTOR(S) : Rolf Weiler et al.

It is certified that error appears in the above-identified patent and that said Letters Patent is hereby corrected as shown below:

ON THE TITLE PAGE, ITEM [19] delete "ITT Industries, Inc., et al."
and insert -- Weiler et al. --.

Item [75] delete "ITT Industries, Inc., New York, N. Y. --.

Item [73] should read

-- [73] Assignee: ITT Industries, Inc., New York, N. Y. --.

Signed and Sealed this

Thirteenth Day of May 1986

[SEAL]

Attest:

Attesting Officer

DONALD J. QUIGG

Commissioner of Patents and Trademarks